Dec. 18, 1928.

D. W. PERIN 1,695,928

ROLLING CONTAINER

Filed Sept. 18, 1924      2 Sheets-Sheet 1

Inventor
Donald W. Perin.
by Roberts, Roberts & Cushman
Att'ys.

Dec. 18, 1928.
D. W. PERIN
1,695,928
ROLLING CONTAINER
Filed Sept. 18, 1924
2 Sheets-Sheet 2
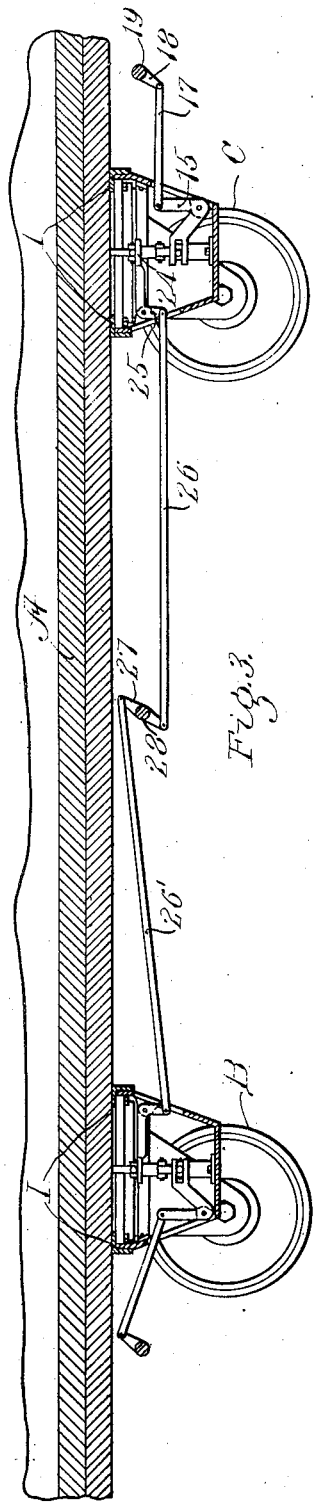
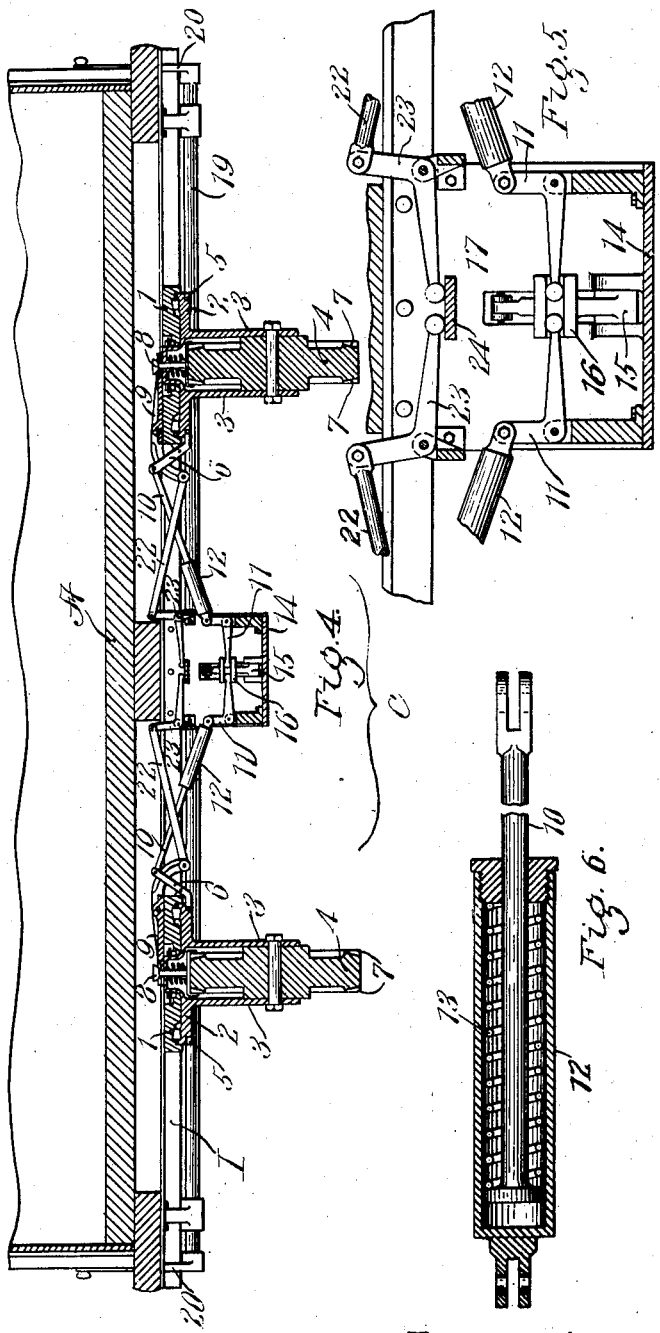
Inventor:
Donald W. Perin.
by Roberts, Roberts & Cushman
Attys.

Patented Dec. 18, 1928.

1,695,928

UNITED STATES PATENT OFFICE.

DONALD W. PERIN, OF BROOKLINE, MASSACHUSETTS, ASSIGNOR TO PERIN-WALSH COMPANY, OF BOSTON, MASSACHUSETTS, A CORPORATION OF MASSACHUSETTS.

ROLLING CONTAINER.

Application filed September 18, 1924. Serial No. 738,395.

This invention relates to containers which are movable into and out of vehicles, such as automobile trucks, freight cars, and ships, and which are first loaded and thereafter moved on the vehicle for delivery to their destination.

Such containers have been mounted upon swivel casters to facilitate movement from one place to another, but in moving them into vehicles the casters swivel to the rear; and when the containers are rolled out of the vehicle the casters tend to swivel through 180° to reverse position and if they start to swivel to such position in opposite directions they cannot roll freely but must slide until all are reversed. When the containers carry a heavy load this makes it difficult to move the containers off the vehicle and frequently results in broken casters. If the casters swivel to reverse position in the same direction the containers are moved sidewise and in restricted places this jams the containers against the adjacent surface such as the side of a box car, truck, etc. When the vehicle is provided with tracks they cannot reverse and therefore bind on the tracks as they tend to reverse.

Objects of the invention are to overcome the above difficulties; to provide means for controlling the swiveling movement of the casters selectively in such a manner that certain of the casters may be locked independently of the remainder; to provide means for locking the entire set of casters in a simple manner; and to provide a mounting for a container having the new and improved features of construction and arrangement hereinafter described.

One concrete embodiment of the invention is illustrated in the accompanying drawings, in which,—

Fig. 3 is a section on the line 3—3 of Fig. 2;
Fig. 4 is a section on the line 4—4 of Fig. 2;

Fig. 5 is an enlarged section of the housing enclosing part of the operating mechanism; and Fig. 6 is a sectional view showing the resilient connecting means for the swivel locking mechanism.

Figures 1, 2:
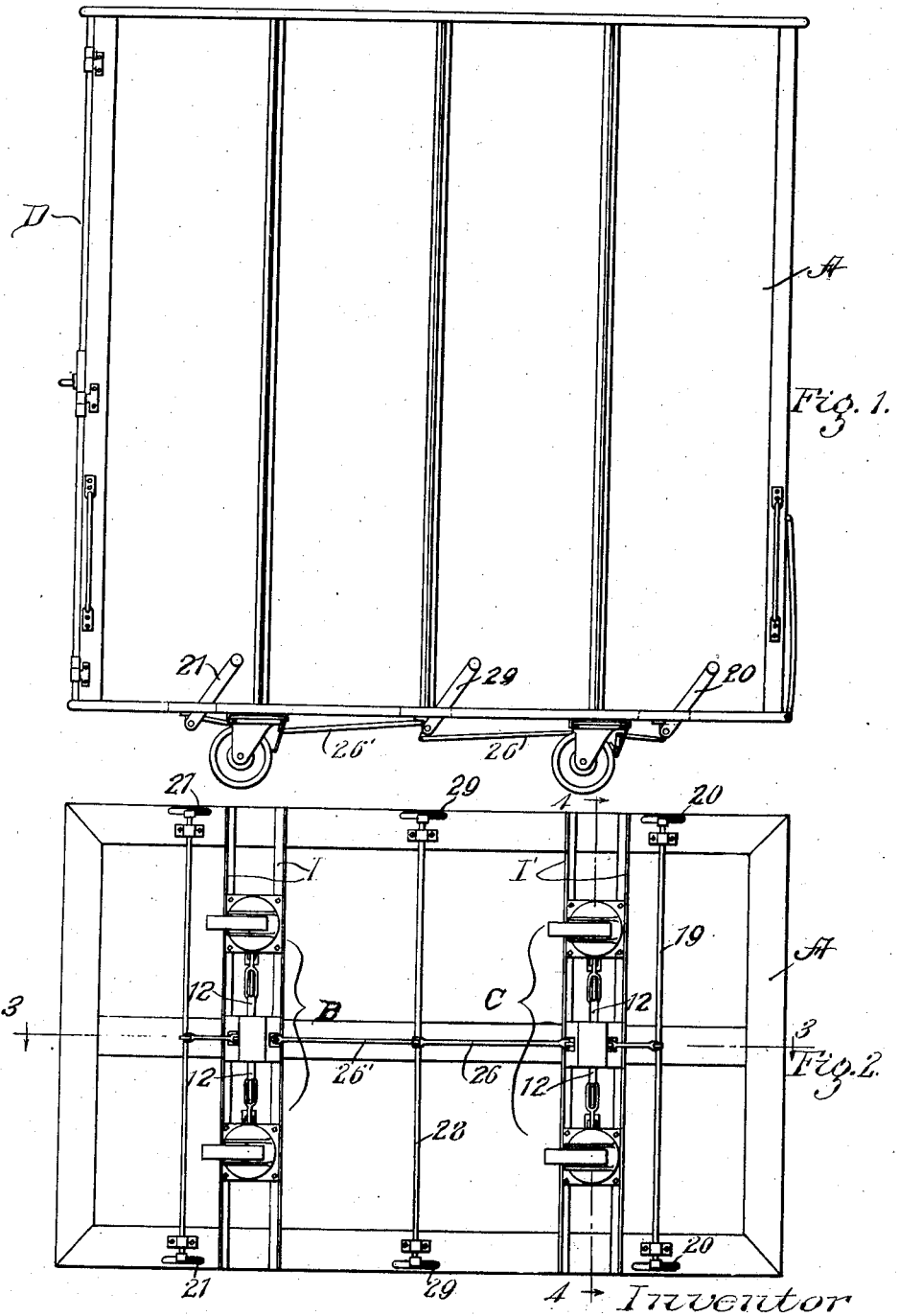
Fig. 1 is a side elevation of a container mounted on swivel rollers.
Fig. 2 is a bottom view of the container.

In the embodiment of the invention illustrated the container A is of rectangular form enclosed on all sides and having a door D hinged to one side provided with a suitable lock so that the container may be filled, the door shut and locked and thereafter moved onto a vehicle such as an automobile truck or ship for delivery to its destination. In order to facilitate movement of the container from place to place it is mounted on swivel casters, in this instance two sets, B and C being secured to pairs of angle irons I and I' respectively which extend transversely of and are fixed to the bottom of the container A. These casters are similarly constructed and form the subject matter of my Patent No. 1,599,485, dated September 14, 1926.

Briefly, each caster comprises as indicated in Fig. 4, a head 1 which is secured as by bolts to a pair of angle irons (I or I') and a plate 2 rotatable on the head 1 provided with fork members 3 between which is journaled a roller 4. On the under side of the plate 2 are a plurality of recesses 5 which are arranged at right angles to each other to receive the end of a bell crank lever 6 pivoted to the head 1, so that by engaging the lever 6 in any one of the recesses, the caster may be locked against swiveling in one of a number of positions. Also to lock the roller 4 against rotation annular rows of grooves 7 are formed about the opposite sides of the periphery of the roller for receiving a spring pressed yoke 8 extending through the head 1 so that normally the roller is locked against rotation, a bell crank lever 9 being pivoted to the head 1 and engaging the projecting head of the yoke 8 to disengage the latter thus to unlock the roller.

Mechanism is provided for conjointly controlling the swiveling movement of each pair of casters independently of the other pair. In this manner one set of casters can be locked against swiveling and the other left free to swivel so that ease with which the container is moved in and out of restricted places is greatly enhanced. Accordingly, for the pair of casters C, links 10 pivoted to the locking levers 6 are resiliently connected to bell crank levers 11, one end of the links 10 extending into casings 12 in which coil springs 13 tend to force the links 10 against the inner end of the casings. In this manner traction exerted by the bell-cranks 11 upon the links 10 actuates the locking levers 6 into one of the recesses 5 in the caster plates 2, but should the ends of the levers 6 not be in registration with a recess 5 respectively the coil springs 13 provide yielding connections which constantly urge the levers into locking position until a recess is brought into proper position to be engaged. Bell cranks 11 are pivoted to opposite sides of a rectangular housing 14 which is suitably secured to the bottom of the container A.

For conjointly actuating the swivel locking levers of a pair of casters a bell crank lever 15 pivoted to the bottom of the housing 14 and arranged at substantially right angles to the bell cranks 11 is provided with a forked end 16 which receives the free ends of the bell cranks 11. Pivoted to the opposite end of the bell crank 15 is a link 17 connected by an arm 18 to a shaft 19 which extends transversely of the container and is provided with handles 20 at the opposite ends thereof for actuating the swivel locking mechanism from either side of the container. Operating handles 21 are also provided on opposite sides of the container for actuating the swivel locking mechanism for the pair of casters B, it being understood that the swivel locking mechanism in both cases is similar.

As above described the casters tend normally to be locked against rotation and in order conjointly to unlock each pair of casters (reference first being made to the pair of casters C) links 22 are pivoted at one end to the yoke actuating bell cranks 9 and at the opposite end to one end of the bell cranks 23 which are pivoted to the upper part of the housing 14, the free ends of the bell cranks 23 resting against the flat end 24 of a bell crank 25 which is pivoted to the housing 14 and arranged at substantially right angles to the bell cranks 23. It will be observed that movement of the bell crank 25 in a counter clockwise direction (Fig. 3) actuates both bell cranks 9 through the connections described in the same direction (Fig. 4) so that the locking yokes 8 are moved upwardly away from the rollers 4 thereby permitting rotation of the latter.

In order conjointly to operate the roller unlocking mechanism for both pairs of casters B and C a link 26 is pivoted at one end to the bell crank 25 of the casters C and to an arm 27 fixed at its center to a shaft 28 which extends transversely of the container A as indicated in Figs. 2 and 3. A link 26' connects the opposite end of the arm 27 to the unlocking mechanism for the pair of casters B so that rotation of the shaft 28 in a counter clockwise direction (Fig. 3) operates concomitantly through the connections described to unlock both pairs of casters B and C. Connected to the opposite ends of the shaft 28 and extending outside the container are operating handles 29 so that the mechanism can be operated from either side of the container in a simple and convenient manner.

It will be evident that the container A may readily be rolled along after the operating handle 29 is moved to unlock the entire set of casters. One or the other of the levers 20 and 21 may be operated to unlock one or the other sets of casters to permit swiveling so that the container can be rolled in the direction desired, and if required both levers 20 and 21 may be moved to unlock all the casters to permit both pairs of casters to swivel so that the container can be moved at substantially right angles. This is of great advantage when the container is moved into and out of restricted places, such as the inside of a box car. After the container has been moved to its proper place on the vehicle the lever 29 may again be operated to lock the casters against rotation and thus prevent movement of the casters so that the container will remain in position as long as required regardless of the jars and shocks imparted by the vehicle in transit.

From the foregoing it will be evident that the swivel locking actuator 20 or 21 has a locking position (shown in Fig. 1) and an unlocked position (to the left in Fig. 1) and that the yielding means comprising spring 13 permits the actuator to be moved into locking position when the lug 6 and socket 5 are out of registry and automatically interengages the lug and socket when the caster is subsequently swiveled to a position where the lug and socket are in registry. It will also be apparent that the locking means has three different conditions, viz: unlocked condition, when the actuator is to the left (Fig. 1), the bell-crank 15 is rotated clockwise (Fig. 3), and the locking lug 6 is retracted from contact with the swivel caster; potentially locked condition, when the parts are in the position shown in the drawings except that the locking lug 6 is not in registry with the socket 5 and is therefore yieldingly pressed against the periphery of the top of the caster frame by spring 13; and locked condition, which is that shown in the drawings after the lug has been snapped into the socket.

By arranging the laterally abutting faces of the locking lugs and sockets in predetermined relation to the sides of the container, at 90° intervals or multiples thereof around the swivel axes, the swivels are positively locked parallel with the sides of the container; and by providing smooth surfaces between the recesses each lug, when actuated toward locking position, slides freely until it comes into registry with a locking recess whereupon it automatically snaps into the recess under the influence of the aforesaid spring. By mounting the locking lugs on the container thru the medium of the non-swiveling parts of the casters they maintain their operative relationship with the locking recesses more reliably under severe conditions of use.

I claim:

1. A container having a plurality of swivel rollers and means for positively locking a set of the rollers against swiveling when said rollers are in a predetermined position, said means comprising lugs, selectively operable linkage adapted to press said lugs in yieldable engagement with surfaces upon swiveling portions of the rollers, and recesses in said surfaces adapted to be engaged by said lugs when the rollers are swiveled to the predetermined positions, whereby one or more of the rollers in the set may be locked in position when swiveled to said predetermined position.

2. A container having a plurality of swivel casters, a swivel locking means having, on the container and swivels respectively, circumferentially abutting faces in predetermined relation to the sides of the container for positively locking the caster rollers parallel with opposite sides of the container, and actuating means for moving the locking means of two of said casters to locking position without locking the rollers of other of the casters, whereby the container may be used as a trailer.

3. A container having pairs of swivel rollers arranged on opposite sides thereof adapted to have unrestrained pivotal movement about vertical axes, means common to each pair for positively locking said rollers against swiveling, said means including a locking element and a yielding connection for said element for yieldingly urging said element into locked position when the latter is moved for locking, and means for actuating the locking means of each pair independently of the remainder.

4. A container having sets of swivel rollers adapted to have unrestrained pivotal movement about vertical axes, means common to each set for positively locking said rollers against swiveling, and means including a shaft extending transversely of the container and operating levers fixed to the opposite ends thereof extending outside the container for actuating the locking means of each set independently of the remainder.

5. A container having sets of swivel rollers adapted to have unrestrained pivotal movement about vertical axes, means common to each set for positively locking said rollers against swiveling, means including levers arranged on opposite sides of the container for actuating the locking means of each set independently of the remainder, means common to each pair of rollers for locking said rollers against rotation, and means extending outside of the container for conjointly actuating the rotation locking means for the several pairs of casters.

6. A container having pairs of swivel rollers arranged on opposite sides thereof adapted to have unrestrained pivotal movement about vertical axes, means common to each pair of rollers for positively locking said rollers against swiveling, means extending to one side of the container for actuating the locking means of each pair independently of the remainder, means common to each pair of rollers for locking said rollers against rotation, and means extending to one side of the container for conjointly actuating the rotation locking means of the several pairs.

7. A container having swivel rollers arranged in pairs on opposite sides thereof, means common to each pair for positively locking said rollers against rotation, means including a shaft extending transversely of the container having operating levers at opposite ends thereof extending outside the container for conjointly actuating the locking means of the several pairs, and means for locking the rollers against swiveling.

8. A container having swivel rollers arranged in sets on opposite sides thereof, means common to each set for positively locking said rollers against rotation, means extending to one side of the container for conjointly actuating the locking means of the several sets, and means for locking the rollers against swiveling.

9. A container having a pair of swivel rollers, means common to said pair for locking said rollers against rotation, and means operable from both sides of the container for actuating said locking means, and means for locking the rollers against swiveling.

10. A container having a plurality of swivel casters each of which has a circular surface coaxial with the swivel axis and provided with a locking recess, a locking lug mounted on the container in predetermined angular position around the swivel axis of each caster to lock the casters parallel with the sides of the container, said lugs being free to slide over said surfaces, when actuated toward locking position, until each locking lug registers with a locking recess and yielding means for causing said lugs automatically to snap into their recesses when in register therewith.

11. A container having a plurality of swivel casters each of which has a circular surface coaxial with the swivel axis and provided with locking recesses spaced 90° apart around the axis, a locking lug mounted on the container in predetermined angular position around the swivel axis of each caster to engage said recesses and lock the casters parallel with the sides of the container, said lugs being free to slide over said surfaces, when actuated toward locking position, until each locking lug registers with a locking recess, the casters being free to roll when locked against swiveling, a spring for urging each lug into locking position, and means for rendering the springs inoperative to move the lugs into locking position.

12. A container having a plurality of swivel rollers, means for holding the rollers against rolling, means for locking the rollers against swiveling, means for actuating said swivel locking means independently of said rolling holding means and means for actuating the holding means of all of the rollers simultaneously.

13. A container having a plurality of swivel rollers, means for holding the rollers against rolling, means for locking the rollers against swiveling, means for actuating said holding means independently of the locking means to hold all the rollers simultaneously.

14. A container having a plurality of swivel rollers mounted thereunder, means for holding the rollers against rolling, means for locking the rollers against swiveling, means extending from certain of said rollers to the side of the container for actuating the swivel locking means of said rollers independently of the other rollers and means for actuating the holding means of all the rollers simultaneously.

15. A container having a plurality of swivel rollers, lug and socket means positioned around the swivel axes in predetermined relation to the sides of the container for positively and concomitantly locking two of the rollers against swiveling parallel with opposite sides of the container without locking other of the rollers, and means extending from certain of said rollers to the side of the container for actuating said swivel locking means.

16. A container having a swivel caster, lug and socket means for locking the caster against swiveling, an actuator for said lug having locking and unlocked positions, yielding means interconnected with said actuator and said lug to permit the actuator to be moved to locking position when the lug and socket are out of registry and to interengage the lug and socket when the caster subsequently swivels to a position where the lug and socket are in registry.

17. A container having a plurality of swivel casters, swivel locking means having, on the container and swivels respectively, lugs and sockets having circumferential abutting faces in predetermined relation to the sides of the container for positively locking the caster rollers parallel with opposite sides of the container, actuating means for moving said locking lugs, and yielding means between said actuating means and lugs for yieldingly urging the lugs into locking position when the actuating means is moved to actuating position.

18. A container having a swivel caster, means for locking the caster against swiveling, said means having unlocked, potentially locked, and locked conditions, manual means for moving said locking means from unlocked condition to potentially locked condition, and automatic means conditioned by the manual movement for moving the locking means from potentially locked condition to locked condition when the caster is swiveled into predetermined position.

19. A container having a plurality of swivel casters arranged about the sides thereof, a swivel locking means for each of the casters, said means including circumferentially abutting faces on the swivels and container, respectively, these faces being disposed so that each of the casters may be locked against swiveling with its plane of rotation parallel to the sides of the container, selectively operable actuating means associated with the locking means, and spring elements associated with the locking means, said actuating means being adapted to be set so that the locking means will be urged toward locking position by the spring elements to cause the locking means to lock each of the selected rollers against swiveling as such a roller swivels to the position parallel to the sides of the container.

Signed by me at Boston, Massachusetts, this 15th day of September, 1924.

DONALD W. PERIN.